3,652,517
VULCANIZABLE POLYMERS AND PROCESS FOR PRODUCING THEM
Toshio Yoshimoto, Seiya Kaneko, Takashi Sasaki, Tsuneaki Narumiya, Hiroshi Yoshii, and Tetsuya Takamatsu, Tokyo, Japan, assignors to Bridgestone Tire Company Limited, Tokyo, Japan
No Drawing. Filed Feb. 5, 1970, Ser. No. 9,071
Claims priority, application Japan, Feb. 8, 1969, 44/9,010
Int. Cl. C08d 5/00, 5/04
U.S. Cl. 260—85.1
17 Claims

ABSTRACT OF THE DISCLOSURE

Halogenated and hydrogenated polymers which are vulcanizable and which are produced by hydrogenating a polymer dissolved in an inert solvent in the presence of a Ziegler-type hydrogenation catalyst, halogenating the resulting hydrogenated polymer by contacting halogen therewith, mixing water or a non-solvent with said hydrogenated polymer solution, removing the catalyst with water or the non-solvent, and recovering the halogenated hydrogenated polymer free from the catalyst.

---

The present invention relates to new vulcanizable polymers, and more particularly to new vulcanizable halogenated hydrogenated polymers, and a process for producing them. It is one of recent advances in the production of hydrogenated polymers to use a Ziegler-type hydrogenation catalyst. The Ziegler-type hydrogenation catalyst referred to herein is a catalyst obtained by the combination of a transition metal compound and a reducing agent such as an organometallic compound or hydride.

When hydrogenated polymers are produced by the use of the Ziegler-type catalyst, certain procedures are generally necessary as next described. The polymers to be hydrogenated are dissolved in a solvent such as a hydrocarbon, hydrogen is brought into contact with the polymers in the presence of the catalyst and then an acid such as hydrochloric acid, sulfuric acid etc. is brought into contact with the solution of the resulting hydrogenated polymers to remove the hydrogenation catalyst. However, it is evident that the additional procedure for removing the catalyst adds to the complexity of the operation and constitutes a disadvantage when the hydrogenated polymers are to be produced industrially. On the other hand, the hydrogenated polymers thus obtained have various excellent properties.

For example, hydrogenated styrene-butadiene copolymers have much higher tensile strength in the unvulcanized state (green strength) and higher resilience in the vulcanized state than non-hydrogenated styrene-butadiene copolymers. However, solvent resistance, flame resistance, heat resistance, weather resistance and tensile strength are still insufficient and it has been found necessary to improve these properties.

It is an object of the present invention to provide new vulcanizable polymers in which the above described unsatisfactory properties have been improved. Another object of the present invention is to provide a simple process for producing them. Other and further objects of the present invention will become apparent upon consideration of the following disclosure.

The present invention provides a process for producing new vulcanizable polymers which comprises the following steps: (1) hydrogenating a polymer having hydrogenatable unsaturated bonds dissolved in an inert solvent in the presence of the Ziegler-type hydrogenation catalyst, (2) halogenating the resulting hydrogenated polymer by contacting halogen therewith, (3) mixing water or a non-solvent which will not substantially dissolve the resulting halogenated hydrogenated polymer with the solution of said halogenated hydrogenated polymer, (4) removing the catalyst with water or the non-solvent and (5) recovering the halogenated hydrogenated polymer free from the catalyst.

According to the present invention, through the above described simple procedure can be obtained new halogenated hydrogenated polymers having improved solvent resistance, improved flame resistance, improved heat resistance, improved weather resistance and improved tensile strength, which properties have been unsatisfactory in corresponding polymers which were hydrogenated but not halogenated.

After the halogenation, it is necessary only to contact the solution of the resulting halogenated hydrogenated polymer with water or the non-solvent for obtaining the halogenated hydrogenated polymer completely free from the hydrogenation catalyst. No further treatment is necessary for removing the catalyst.

The starting materials of the present invention are polymers having hydrogenatable unsaturated bonds. The hydrogenatable unsaturated bonds include carbon-carbon double and triple bonds, the former being preferable. Carbon-carbon double bonds are derived from dienes which may be conjugated dienes or non-conjugated dienes. The polymers having the above described hydrogenatable unsaturated bonds are a homopolymer of the diene and a copolymer of the diene with a monomer copolymerizable therewith such as a vinyl-substituted aromatic hydrocarbon, monoolefin and other diene. As dienes, butadiene and isoprene are preferably used. Examples of the polymers include polybutadiene, polyisoprene, butadiene-styrene copolymer, butadiene-a-methyl styrene copolymer, butadiene-isoprene copolymer, butadiene-acrylonitrile copolymer, butadiene-vinyl piridine copolymer and the like. These polymers can be prepared by bulk polymerization, solution polymerization, emulsion polymerization and the like.

The polymer solution prepared by solution-polymerization is preferably hydrogenated as it is, namely without recovering the polymer therefrom, by adding the hydrogenation catalyst directly to that polymer solution. The Ziegler-type hydrogenation catalyst as used in the present invention can easily hydrogenate polymers with a Mooney viscosity of more than 20, and therefore when the obtained halogenated hydrogenated polymer is to be used in severe conditions, it is preferable to hydrogenate a polymer with more than a 20 Mooney viscosity. The viscosity of the solution for the higher Mooney viscosity polymer is to be fairly high and the hydrogenation must be conducted under severe conditions. Usually polymers of which the Mooney viscosity is below 100 are used. This is decided solely depending on the use of the obtained halogenated hydrogenated polymer which polymer is to be hydrogenated and halogenated.

As the halogen, chlorine or bromine is preferably used.

The Ziegler-type hydrogenation catalyst used in the present invention is obtained by the combination of an organic compound of a transition metal and a reducing agent such as an organometallic compound and a hydride. Among the transition metals, nickel, cobalt, iron, chromium and titanium are preferable.

As the organic compound of the transition metal, those of which organic radicals are attached to the metal through oxygen are preferable. One of the preferable compounds is a metal carboxylate having the formula of $(RCOO)_nM$, wherein M is a metal selected from the group consisting of nickel, cobalt, iron and chromium, R is a hydrocarbon radical having 1 to 50 carbon atoms, preferably from 5 to 30 carbon atoms and $n$ is a valence number of M. These metal carboxylates include nickel, cobalt, iron and chromium salts of hydrocarbon aliphatic acid, hydrocarbon aromatic acid and hydrocarbon cycloaliphatic acid. Examples of hydrocarbon aliphatic acids include hexanoic acid, heptanoic acid, octanoic acid, nonanoic acid, decanoic acid, dodecanoic acid, myristic acid, palmitic acid, stearic acid, dodecenoic acid, oleic acid, linoleic acid, rhodinic acid and the like. Examples of hydrocarbon aromatic acid include benzoic acid and alkyl-substituted aromatic acids in which alkyl has from 1 to 20 carbon atoms. These include t-butyl, 2-ethylhexyl-, dodecyl-, and nonylbenzoic acids and the like. Examples of cycloaliphatic acids include naphthenic acid, cyclohexylcarboxylic acid, abietic type resin acid and the like. Commercially available metallic soaps such as naphthenic acid salts, rosin acid salts, linoleic acid salts, oleic acid salts, stearic acid salts and tall oil salts may be used. Among them, nickel and cobalt carboxylates are preferably used.

Other preferable organic compounds are metal chelate compounds, in which the chelating groups are attached to nickel, cobalt or iron through a pair of two oxygen atoms. As the chelating groups, $\beta$-ketons, $\alpha$-hydroxycarboxylic acids, $\beta$-hydroxycarboxylic acids and $\beta$-hydroxycarbonyl compounds may be used. Examples of the $\beta$-ketones include acetylacetone, 1,3-hexanedione, 3,5-nonandione, methyl acetoacetate, ethyl acetoacetate and the like. Examples of the $\alpha$-hydroxycarboxylic acids include lactic acid, glycolic acid, $\alpha$-hydroxyphenylacetic acid, $\alpha$-hydroxy-$\alpha$-phenylacetic acid, $\alpha$-hydroxycyclohexylacetic acid and the like.

Examples of the $\beta$ - hydroxycarboxylic acids include salicylic acid, alkyl-substituted salicylic acid, and the like. Examples of the $\beta$-hydroxycarbonyl compounds include salicylaldehyde, o-hydroxyacetophenone and the like. Examples of the metal chelate compounds having the above described chelating groups include bis (acetylacetone) nickel, tris (acetylacetone) cobalt, bis (ethyl acetoacetate) nickel, bis (ethyl acetoacetate) cobalt, bis (3,5-diisopropylsalicylic acid) nickel, bis (salicylaldehyde) nickel, bis (salicylaldehyde) cobalt and the like.

Other preferable organic compounds are metal chelate compounds in which the chelating groups are attached to nickel, cobalt or iron through a pair of nitrogen atom and oxygen atom. Examples of the chelating groups include $\beta$-hydroxyquinoline, 5-methyl-$\beta$-hydroxyquinoline, 10-hydroxybenzoquinoline, salicylaldoxime, $\alpha$-benzoinoxime, $\alpha$-nitrosophenol, $\alpha$-nitroso-$\beta$-naphthol, salicylaldehyde-imine and the like. Examples of the metal chelate compounds having the above described chelating groups include bis (salicylaldoxime) nickel, bis (salicylaldoxime) cobalt, bis ($\beta$-hydroxyquinoline) nickel, bis ($\beta$-hydroxyquinoline) cobalt, tris ($\beta$-hydroxyquinoline) iron, tris ($\beta$-nitroso-naphthol) cobalt and the like.

Other preferable organic compounds are titanium alkoxides. Examples include titanium tetraethoxide, titanium tetra-n-propoxide, titanium tetraisopropoxide, titanium tetra-n-butoxide, titanium tetraisobutoxide, titanium tetra (s-butoxide) and the like.

Among them, organic compounds of nickel or cobalt are preferably used, because they form active hydrogenation catalysts.

As the reducing agent, organometallic compounds and hydrides of the metals of Group I, II and III of the Periodic Table are preferably used.

The organometallic compounds having the formula of $M'R'_{n'}$, wherein $M'$ is a metal selected from the group consisting of lithium, magnesium and aluminium, $R'$ is selected from the group consisting of hydrocarbon radical having from 1 to 12 carbon atoms, hydrogen and an alkoxy radical having from 1 to 12 carbon atoms and $n'$ is the valence number of $M'$, are preferably used.

The hydrocarbon radical includes an alkyl, aryl, alkaryl, aralkyl and cycloaliphatic group. Examples of such radicals include methyl, ethyl, n-propyl, i-propyl, n-butyl, i-butyl, sec-butyl, t-butyl, pentyl, hexyl, heptyl, octyl, nonyl, decyl, dodecyl, phenyl, benzyl, tolyl, cyclopentyl, cyclohexyl, cyclohexenyl and naphthyl radicals. The group combined to oxygen in the alkoxy radical is exemplified as described above too.

Examples of such organometallic compounds include ethyllithium, n-propyllithium, n-butyllithium, i-butyllithium, sec-butyllithium, t-butyllithium, n-pentyllithium, phenyllithium, diethylmagnesium, di-n-propylmagnesium, di-n-butylmagnesium, diphenylmagnesium, triethylaluminium, tri-n-propylaluminium, triisopropylaluminimum, tri-n-butylaluminium, triisobutylaluminium, triamylaluminium, trihexylaluminium, trioctylaluminium, tridodecylaluminium, diethylisobutylaluminium, diethyloctylaluminium, tricyclohexylaluminium, triphenylaluminium, didodecylaluminiumhydride, diisobutylaluminiumhydride, diethylaluminiumethoxide, dibutylaluminiumbuthoxide and their mixtures. Among them, a trialkylaluminium is more preferably used. In addition to the above mentioned compounds, the organometallic compounds and the metal hydrides having two kinds of metals such as lithiumaluminiumtetrabutyl, lithiumaluminiumhydride and sodiumborohydride may be used.

The molar ratios of the transition metal compound to the reducing agent can be varied in a wide range. Usually ratios of from 1:0.1 to 1:10 are used, but ratios from 1:0.5 to 1:8 are preferable. In addition to the catalysts consisting of the transition metal compound and the reducing agent as referred to above, those to which is added a third component such as olefin and acetylene for increasing the activity of the catalyst may be used.

According to the present invention, hydrogenation of the polymers is carried out in the solution form in the presence of the Ziegler-type catalyst by contacting hydrogen with that solution. It is preferable to effect the hydrogenation under such conditions that degradation of polymeric chains does not occur and the number average molecular weight of the polymer is not substantially decreased. Therefore, the hydrogenation temperature is preferably of between 0° and 120° C. When the Ziegler-type hydrogenation catalysts are used, olefinically unsaturated bonds are selectively hydrogenated under less than 50 atms. preferably below 10 atms. pressure of hydrogen, but under a higher pressure, say about 50 atms. or more olefinically unsaturated bonds and aromatic nucleous are hydrogenated simultaneously. It is thus preferable to determine and select a desirable hydrogen pressure depending upon the use of the halogenated hydrogenated polymers. In the case of styrene-butadiene copolymer, the non-selectively hydrogenated copolymer is more resin like than the selectively hydrogenated one. The catalyst concentration is adjusted depending upon an amount of impurities in the polymer solution to be hydrogenated. Generally, at least 0.1 mmol of transition metal compound is used per liter of polymer solution. The concentration in the solution of the polymer to be hydrogenated is varied widely depending upon the inert solvent, hydrogenation temperature and type of reaction apparatus to be used. Usually, from 1 to 30 percent by weight are used. From 3 to 20 percent by weight are preferable.

According to the present invention, a halogen is contacted with the resulting hydrogenated polymer solution in which the Ziegler-type hydrogenation catalyst is left to effect the halogenation of the hydrogenated polymer. Known conditions for the halogenation are used. The lower limit of the halogenation temperature is specified according to the viscosity of the hydrogenated polymer solution. The viscosity increases rapidly as the temperature becomes lower. The upper limit is determined according to the solubility. The solubility of halogen in the hydrogenated polymer solution becomes smaller at the higher temperature.

Generally, the halogenation is effected at a temperature of from 0° to 120° C. When the halogenation is carried out in darkness, addition of a halogen to the unsaturated bonds of the hydrogenated polymer occurs selectively. Under exposure to light, not only the addition but also substitution of a hydrogen atom in the hydrogenated polymer with a halogen occurs simultaneously. It is thus preferable to carry out the halogenation in darkness when the main object of the halogenation is to decrease unsaturated bonds left in the hydrogenated polymer.

When the halogenation is carried out in the ambient light, the solvent dissolving the hydrogenated polymer itself is also halogenated. It is necessary to effect the halogenation in darkness when the solvent is recovered and recycled.

Solvents as used in the hydrogenation and halogenation must be such as not to deactivate the Ziegler-type hydrogenation catalyst and at the same time must be such as to be able to dissolve the halogenated hydrogenated polymer at the end of the halogenation to such a degree as to prevent phase separation. The solvents include saturated hydrocarbons, aromatic hydrocarbons, hydroaromatic hydrocarbons, halogenated aromatic hydrocarbons, ethers and the like. Among them, saturated hydrocarbons, aromatic hydrocarbons and hydroaromatic hydrocarbons are preferably used. Examples of the solvents include n-hexane, n-heptane, n-octane, benzene, toluene, xylene, cyclohexane, methylcyclohexane, Decalin, tetralin, chlorobenzene, tetrahydrofuran, anisole, dioxane and their mixtures.

According to the present invention, after a halogen dissolved in the halogenated hydrogenated polymer solution is removed therefrom, water or a non-solvent is mixed with the solution in which the Ziegler-type hydrogenation catalyst is left and then the catalyst is moved into the water or the non-solvent. Examples of the non-solvent are an alcohol, a ketone and the like. Methanol, ethanol and propanol are preferably used. An amount of water or the non-solvent to be mixed is at least 0.2 times of the polymer solution by volume. Preferably, more than 0.5 times is used. As the solution or precipitate of the halogenated hydrogenated polymer free from the catalyst residue can be obtained after the halogenation, the halogenated and hydrogenated polymer can be recovered easily by known methods. For example, steam strip, distillation or filtering is carried out. It is one of the merits of the present invention that the transition metal used for the hydrogenation catalyst and left in the halogenated hydrogenated polymer can be decreased down to 50 p.p.m. or less merely by using the simple procedure referred to above.

The halogenated hydrogenated polymers of the present invention have various desirable properties compared with general purpose rubbers such as natural rubber, styrene-butadiene rubber and polybutadiene. For example, they have extremely high tensile strength and good solvent resistance in the unvulcanized state, and when vulcanized have high hardness and high resilience still having high tensile strength.

Degrees of the hydrogenation and halogenation are determined depending upon the use of the obtained halogenated hydrogenated polymers. Some properties such as solvent resistance and flame resistance are improved when the halogen content in the polymer is high. The halogenated hydrogenated polymers of the present invention can be vulcanized by the conventional method, but it is also possible to use them as thermoplastic resins in the unvulcanized state when their unsaturated bonds are almost completely saturated with hydrogen and halogen. The halogenated hydrogenated polymers of the present invention are very useful as raw materials for rubber articles.

The present invention is illustrated in the greater detail in the following examples, but it is to be noted that the examples are not intended to restrict the invention.

EXAMPLE 1

100 ml. of a toluene solution containing 5% by weight of a styrene-butadiene random copolymer (styrene/butadiene=18/82) were prepared in a 300-ml. shakable glass reactor and allowed to come in contact with hydrogen under one atmosphere in the presence of a Ziegler-type hydrogenation catalyst. Hydrogenation reaction was carried out at 50° C. with shaking and the amount of hydrogen consumed by the reaction was continuously measured by means of a gas burette. A solution containing 0.3 m. mol of nickel was sampled out of the solution obtained by reacting nickel naphthenate, triethylaluminium and cyclopentadiene in a molar ratio of 1:3:1 at 50° C. in toluene under a nitrogen atmosphere, to be used as the catalyst.

After the necessary amount of hydrogen for hydrogenating 40% of butadiene portion of the high polymer had been consumed, a chlorine gas was passed therethrough at a rate of 48–150 ml./min. for about 5 minutes to effect the chlorination reaction. After completion of the reaction, chlorine dissolved in the solution of the hydrogenated and chlorinated high polymer was expelled by passing nitrogen therethrough. Furthermore, the solution was mixed with 1 liter of water and stirred, whereby the hydrogenation catalyst was transferred to the water phase to be removed together with the water. Then, said solution was mixed with a large amount of methanol, whereby the high polymer was precipitated to be recovered. A predetermined amount of the rubber-like high polymer obtained by drying was burnt at about 550° C., and generated chlorine was absorbed in calcium carbonate, dissolved in acetone-water and titrated with silver nitrate, whereby the chlorine content of the high polymer was found to be 20.0% by weight. Furthermore, nickel, the catalyst residue remaining in the high polymer, was found to be not more than 10 p.p.m. by a fluorescent X-ray analysis.

EXAMPLE 2

Various high polymers were subjected to hydrogenation and chlorination reactions in the same manner as in Example 1, and after completion of the reaction, the solution of the hydrogenated and chlorinated high polymer was mixed with 1 liter of water and stirred, whereby the Ziegler-type hydrogenation catalyst was transferred to the water phase to be removed together with the water.

Then, said solution was subjected to steam stripping, whereby the high polymer was recovered from the solution.

The degree of hydrogenation, which is to be 100% when the butadiene portion of the high polymer is completely hydrogenated, chlorine content and amount of nickel residue are given in Table 1.

Table 1

| Test run No. | High polymer | Degree of hydrogenation (percent) | Chlorine content (percent by weight) | Nickel residue (p.p.m.) |
|---|---|---|---|---|
| 1 | Styrene-butadiene random copolymer (styrene/butadiene=25/75). | 30 | 19.1 | 56 |
| 2 | do | 60 | 13.3 | 43 |
| 3 | do | 90 | 11.6 | 25 |
| 4 | Styrene-butadiene random copolymer (styrene/butadiene=18/82). | 80 | 10.8 | 23 |
| 5 | Styrene-butadiene random copolymer (styrene/butadiene=23/77). | 40 | 15.6 | 15 |
| 6 | Polybutadiene (cis-1.4-polymer=96.2%) (trans-1.4-polymer=2.8%) (1.2-polymer=1.0%). | 5.8 | 31.1 | <10 |
| 7 | do | 50 | 14.9 | <10 |

EXAMPLE 3

100 ml. of a toluene solution containing 5% by weight of the high polymer were prepared in a 300-ml. glass reactor provided with a stirrer and allowed to come in contact with hydrogen under one atmosphere in the presence of a Ziegler-type hydrogenation catalyst. The hydrogenation reaction was carried out at 50° C. with stirring. A solution containing 0.4 mmol of nickel was sampled out of the solution obtained by reacting (bis) acetylacetone nickel, triethylaluminium and dicyclopentadiene in a molar ratio of 1:3:1 at 50° C. for 10 minutes, to be used as the catalyst. After the required amount of hydrogen had been consumed, a chlorine gas was passed therethrough in darkness to carry out the chlorination reaction. After completion of the reaction, the hydrogenated and chlorinated high polymer was recovered and dried in the same manner as in Example 1. The chlorine content was measured and the double bond of the high polymer was determined according to Kemp-Wijs method [A. R. Kemp, H. Peters: Ind. Eng. Chem., 15, 453–459 (1943)]. The results are given in Table 2.

TABLE 2

| Test run No. | High polymer | Degree of hydrogenation (percent) | Amount of residual double bond,[1] (percent) | Chlorine content (percent by weight) |
|---|---|---|---|---|
| 1 | Styrene-butadiene random copolymer (styrene/butadiene=25/75). | 60.0 | 26.7 | 16.6 |
| 2 | Styrene-butadiene random copolymer (styrene/butadiene=18/82). | 80.0 | 5.3 | 18.7 |
| 3 | Polybutadiene (cis-1.4-polymer=35%) (trans-1.4-polymer=55%) (1.2-polymer 10%). | 50.0 | 20.9 | 22.3 |

[1] The butadiene unit present prior to the hydrogenation is presumed to be 100%.

It is to be noted that the chlorine content (percent by weight), when calculated from the above results in the case where two chlorine atoms are added to unsaturated bonds of the butadiene portion, was in a good agreement with the determined value within a range of analytical error. This means that in the chlorination reaction only the addition reaction selectively took place. Furthermore, the amounts of nickel residue in the recovered hydrogenated and chlorinated high polymer were all not more than 10 p.p.m.

EXAMPLE 4

The same hydrogenation and chlorination reactions as in Example 3 were carried out using a n-hexane solution of styrene-butadiene random copolymer (styrene/butadiene=25/75), whereby a hydrogenated and chlorinated high polymer with a degree of hydrogenation of 60.0%, a residual double bond amount of 2.2% and a chlorine content of 7.7% by weight was obtained. After completion of the chlorination, dissolved chlorine was removed by injecting a nitrogen gas therein, and a portion of the thus obtained solution of hydrogenated and chlorinated high polymer was investigated by means of a highly sensitive gas chromatograph, but no chlorinated n-hexane was detected.

EXAMPLE 5

A hydrogenated and chlorinated high polymer with a hydrogenation degree of 21.0% and a chlorine content of 28.8% was synthesized in the same manner as in Example 1 and for comparison purpose a hydrogenated high polymer having a degree of hydrogenation of 21.0% was also synthesized. These high polymers were made into sheets of 8 x 35 mm. and a thickness of 2 mm. to be dipped in various solvents at the room temperature for 68 hours to investigate their resistances to solvent. The results are given in Table 3.

TABLE 3

| Solvent | Hydrogenated high polymer | Hydrogenated and chlorinated high polymer |
|---|---|---|
| n-Hexane | Swollen | Undissolved. |
| Carbon tetrachloride | Dissolved | Swollen. |
| Benzene | do | Do. |
| Acetone | Undissolved | Undissolved. |
| Pyridine | Dissolved | Swollen. |

These results indicate that the hydrogenated and chlorinated high polymer prepared according to the present method has an excellent solvent resistance.

EXAMPLE 6

2.5 liters of a toluene solution containing 7% by weight of a styrene-butadiene random copolymer were prepared in a 5-liter glass reactor provided with a stirrer and allowed to come in contact with hydrogen under one atmosphere in the presence of a Ziegler-type hydrogenation catalyst. The hydrogenation reaction was carried out at room temperature with stirring. A solution containing 15 mmol of nickel was sampled out of the solution obtained by reacting nickel naphthenate, triethylaluminium and dicyclopentadiene in a molar ratio of 1:3:1 to be used as the catalyst.

After the required amount of hydrogen had been consumed, a chlorine gas was passed therethrough to effect the chlorination reaction. After completion of the reaction, the hydrogenated and chlorinated high polymer was recovered and dried in the same manner as in Example 1, and its physical characteristics were determined. Furthermore, a hydrogenated but not chlorinated high polymer was synthesized in the similar manner for comparison with the hydrogenated and chlorinated high polymer.

The results are given in Table 4.

TABLE 4

| | A | B | C | D |
|---|---|---|---|---|
| Composition: | | | | |
| Styrene/butadiene | 18/82 | 18/82 | 25/75 | 25/75 |
| Degree of hydrogenation percent | 30 | 30 | 60 | 60 |
| Chlorine content (percent by weight) | | 11.6 | | 17.5 |
| Non-vulcanized rubber substance: | | | | |
| Hardness (JIS) | 30 | 40 | 58 | 60 |
| 300% modulus (kg./cm.²) | 4.2 | 5.9 | 22.2 | 37.3 |
| Tensile strength (kg./cm.²) | 3.7 | 5.9 | 61.7 | 70.1 |
| Elongation (percent) | 590 | 300 | 1,050 | 625 |
| Compounding recipe, phr.:[1] | | | | |
| High polymer | 100 | | | |
| Carbon black ISAF | 45 | | | |
| Aromatic oil | 10 | | | |
| Zinc oxide | 5 | | | |
| Stearic acid | 2 | | | |
| Phenyl-β-naphthylamine | 1 | | | |
| N-oxydiethylene-2-benzothiazole sulfonamide | 1 | | | |
| Sulfur | | | | |
| Vulcanization: | | | | |
| Temperature (° C.) | 145 | 145 | 145 | 145 |
| Time (min.) | 160 | 160 | 110 | 110 |
| Physical property of vulcanized rubber: | | | | |
| Hardness (JIS) | 70 | 79 | 79 | 85 |
| 100% modulus (kg./cm.²) | 30 | 65 | 53 | 126 |
| Tensile strength (kg./cm.²) | 157 | 163 | 151 | 174 |
| Elongation (percent) | 325 | 205 | 240 | 120 |
| Impact resilience (percent): | | | | |
| 100° C | 72.3 | 75.6 | 69.8 | 78.1 |
| 150° C | 77.7 | 80.7 | 73.1 | 80.3 |

[1] Abbreviation of parts by weight per 100 parts of rubber.

EXAMPLE 7

The butadiene portion of a styrene-butadiene random copolymer (styrene/butadiene=18/82) was 90% hydrogenated and successively chlorinated until the double bond had almost disappeared in the same manner as in Example 5, whereby a hydrogenated and chlorinated high polymer was obtained.

The thus obtained high polymer was molded in sheets having a thickness of 2 mm. by pressing at 120° C. for 10 minutes and its physical properties were determined. The result is given in Table 5, in contrast with that as to the hydrogenated but not chlorinated high polymer.

TABLE 5

| | A | B |
|---|---|---|
| Degree of hydrogenation (percent) | 90 | 90 |
| Chlorine content (percent by weight) | | 9.7 |
| Hardness (JIS) | 79 | 83 |
| 300% modulus (kg./cm.$^2$) | 63 | 123 |
| Tensile strength (kg./cm.$^2$) | 145 | 154 |
| Elongation (percent) | 580 | 360 |
| Impact resilience (percent, 27° C.) | 60.8 | 70.2 |

What we claim is:

1. A process for producing vulcanizable polymers which comprises the following steps:
   (1) hydrogenating a polymer selected from the group consisting of polybutadiene and styrene-butadiene random copolymers by contacting hydrogen with hydrogenatable unsaturated bonds of the polymer in an inert solvent in the presence of a Ziegler-type hydrogenation catalyst,
   (2) halogenating the resulting hydrogenated polymer by contacting halogen therewith,
   (3) mixing water or a non-solvent which will not substantially dissolve the resulting halogenated hydrogenated polymer with the solution of said halogenated hydrogenated polymer,
   (4) removing the Ziegler-type hydrogenation catalyst into water or the non-solvent and
   (5) recovering the halogenated hydrogenated polymer free from the Ziegler-type hydrogenation catalyst.

2. The process as claimed in claim 1, wherein said Ziegler-type hydrogenation catalyst is obtained by mixing an organic compound of a metal selected from the group consisting of nickel, cobalt, iron, chromium and titanium with an organometallic compound or hydride of a metal selected from the group consisting of Group I, II and III metals of the Periodic Table.

3. The process as claimed in claim 2, wherein said organic compound of the metal is a metal carboxylate.

4. The process as claimed in claim 2, wherein said organic compound of the metal is a metalate compound, chelating groups of which are attached to the metal through oxygen atom.

5. The process as claimed in claim 2, wherein said organometallic compound is an alkyllithium compound.

6. The process as claimed in claim 2, wherein said organometallic compound is an alkylaluminum compound.

7. The process as claimed in claim 2, wherein the molar ratio of said organic compound to said organometallic compound or hydride is from 1:0.1 to 1:10.

8. The process as claimed in claim 1, wherein said hydrogenation is carried out at a temperature ranging from 0° to 120° C.

9. The process as claimed in claim 1, wherein said hydrogenation is carried out under a pressure of hydrogen less than 50 atms.

10. The process as claimed in claim 1, wherein said inert solvent is selected from the group consisting of a saturated hydrocarbon, an aromatic hydrocarbon and a hydroaromatic hydrocarbon.

11. The process as claimed in claim 1, wherein the concentration of said catalyst is at least 0.1 mmol of said organic compound per a liter of said solution.

12. The process as claimed in claim 1, wherein the concentration of said polymer in said solution is from 1 to 30 percent by weight.

13. The process as claimed in claim 1, wherein said polymer is derived from monomers comprising a diene.

14. The process as claimed in claim 13, wherein said diene is butadiene.

15. The process as claimed in claim 1, wherein said halogen is chlorine.

16. The process as claimed in claim 1, wherein said halogen is bromine.

17. The process as claimed in claim 1, wherein the volume ratio of said solution to said water or the non-solvent is 1 to at least 0.2.

References Cited

UNITED STATES PATENTS

| 2,962,482 | 11/1960 | Cottle et al. | 260—85.3 |
| 3,009,906 | 11/1961 | Eichhorn et al. | 260—93.5 |
| 3,531,445 | 9/1970 | Yoshimoto et al. | 260—94.7 X |
| 3,506,741 | 4/1970 | Trepka et al. | 260—94.7 X |

FOREIGN PATENTS

| 819,702 | 9/1959 | Great Britain | 260—94.7 |
| 697,790 | 11/1964 | Canada | 260—94.7 |
| 1,130,173 | 5/1962 | Germany | 260—94.7 |

JAMES A. SEIDLECK, Primary Examiner

W. F. HAMROCK, Assistant Examiner

U.S. Cl. X.R.

260—82.1, 83.3, 96 HY, 96 HA, 94.7 H, 94.7 HA